G. T. FURNESS AND L. R. SENN.
TOOL ADJUSTING MICROMETER.
APPLICATION FILED SEPT. 23, 1920.
1,421,073.
Patented June 27, 1922.
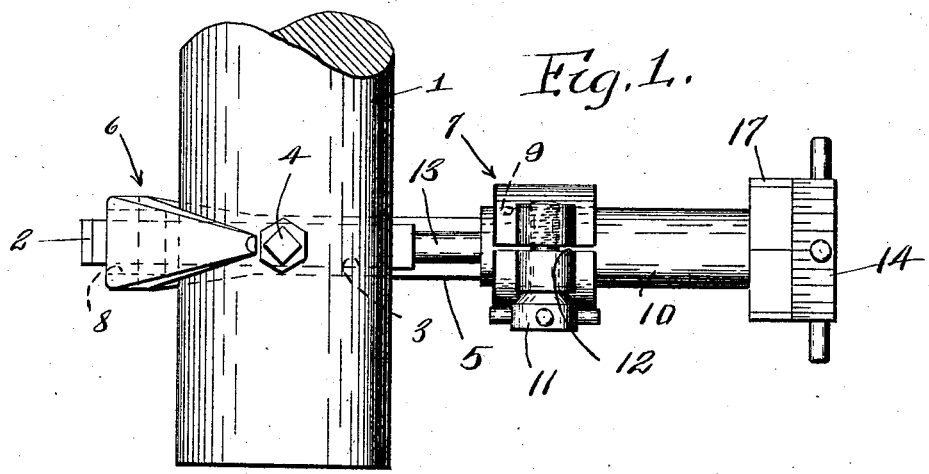
Fig. 1.
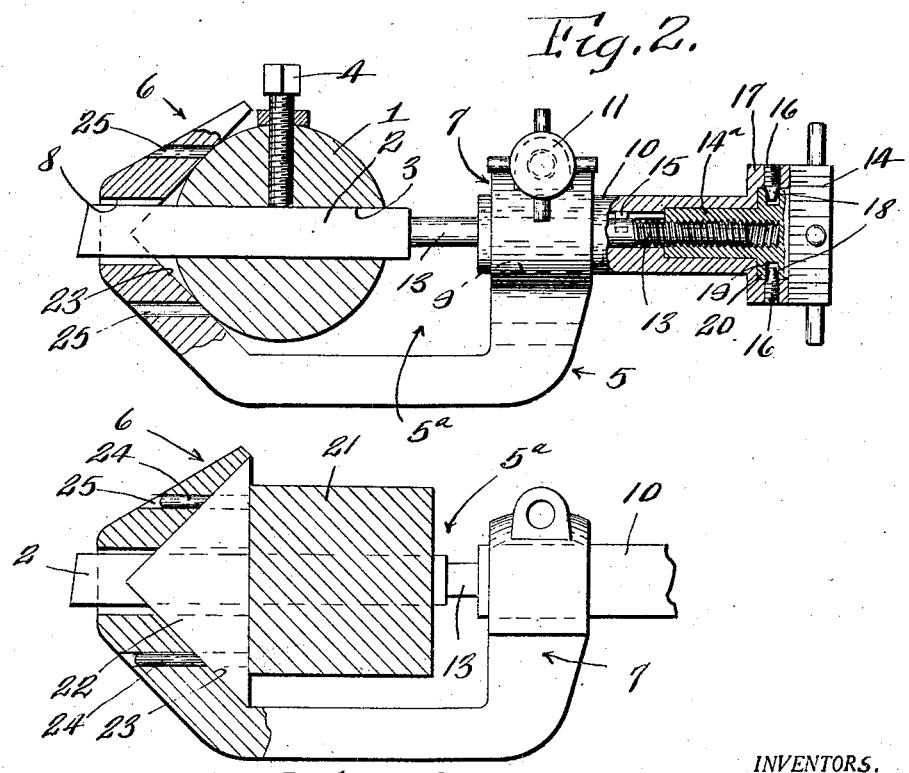
Fig. 2.
Fig. 3.
INVENTORS.
George T. Furness.
BY Lloyd R. Senn.
Parsons & Bodell
ATTORNEYS.

UNITED STATES PATENT OFFICE.

GEORGE T. FURNESS AND LLOYD R. SENN, OF SYRACUSE, NEW YORK.

TOOL-ADJUSTING MICROMETER.

1,421,073.

Specification of Letters Patent. Patented June 27, 1922.

Application filed September 23, 1920. Serial No. 412,323.

*To all whom it may concern:*

Be it known that we, GEORGE T. FURNESS and LLOYD R. SENN, citizens of the United States, and residents of Syracuse, in the county of Onondaga and State of New York, have invented a certain new and useful Tool-Adjusting Micrometer, of which the following is a specification.

This invention has for its object, a particularly simple and efficient micrometer gage or instrument for setting cutting tools accurately relatively to the tool holder or boring-bar in order to make a cut a predetermined depth. The invention consists in the novel features, and in the combinations and constructions hereinafter set forth and claimed.

In describing this invention, reference is had to the accompanying drawings, in which like characters designate corresponding parts in all the views.

Figure 1 is an edge view of this gage, the contiguous portion of the boring bar being shown.

Figure 2 is an elevation, partly in section, looking upwardly in Figure 1.

Figure 3 is a view similar to Figure 2, of another form of this invention.

In machining or cutting work to an exact size, when the work has been machined, bored, cut or turned to approximately the required size, the last cut or operation must be accurately made, and this instrument is for the purpose of accurately positioning the cutter or tool for this last cut or operation.

In the illustrated exemplification of this invention, 1 designates a tool holder, or post, having suitable means for holding a tool 2, here shown, as a transverse passage 3, through the bar and a set screw 4 for holding the tool in fixed relation to the bar.

The gage or instrument for setting the tool comprises a body 5 in the form of opposing fixed jaws or sides 6, 7, which confine the passage 5ª for the boring bar, the body also having additional passages 8 and 9, in the jaws 6, 7, respectively, and extending transversely of the passage 5ª on opposite sides thereof, the former passage 8 being for receiving the end of the tool 2 which projects beyond the tool post, and the latter passage 9 supporting the micrometer gage mechanism. This gage mechanism comprises a tubular slide 10 slidable in the passage 9 and held in any adjusted position by suitable means as a clamping screw 11 arranged to clamp opposite sides of the bearing in which the passage 9 is formed, which bearing is split at 12.

In addition to the slide 10 the micrometer mechanism also includes a gage member 13 arranged in the slide 10 and adjustable lengthwise thereof and micrometer means for adjusting the gage member. This micrometer means may be of any suitable form, size and construction and comprises a head 14 having a sleeve or hub 14ª rotatable in the outer end of the slide 10 and which is connected to the gage member 13 by screw threads. The gage member is held from turning movement by the pin 15 projecting radially into the gage member 13, and into a lengthwise key-way in the bore of the slide member 10 and the head 14 and its hub 14ª are held from endwise movement by suitable means as screws 16 carried by a head or collar 17 on the outer end of the slide 10 adjacent to the head 14, these screws having tapered ends 18 which radially project into an annular groove 19 formed in an enlargement 20 of the hub 14ª adjacent the head 14, the head or collar 17 on the slide being provided with a suitable countersink for receiving the enlargement 20. The head 13 on the gage member is provided with suitable micrometer graduations and also the head or collar 17 is provided with suitable graduations.

In Figures 1 and 2, a round tool post is shown and in Figure 3 is illustrated this invention as adapted to be used in connection with an angular or square tool post 21. In Figure 3 a triangular adapter block 22 is shown for fitting in the square or angular faces 23 of the jaws 6 at one side of the passage 5ª. This adapter block is provided with pins 24 which fit into holes 25 provided in the body or jaw 6 parallel to the passage 8 on opposite sides thereof.

In operation, after the work has been machined, cut, turned or bored, to the approximate dimensions required it is gaged by any well-known micrometer and the depth of additional amount of material to be cut off determined. Our tool or instrument is then applied to the tool post with the tool 2 projecting into the passage 8, the head 13 turned to the zero point of the micrometer scale, the clamping screw 11 loosened; and the slide 10 moved inwardly until the end of the gage member touches the rear end of the tool 2. The set screw 4 is then loosened to permit the tool 2 to slide in the passage 3 of the tool post, the screw 11 tightened and the head 14 turned an amount sufficient to advance the tool to make a cut of the required depth. The set screw 4 is then tightened to hold the tool 2 in its adjusted position and the tool post placed back in the same position it occupied before the tool 2 was adjusted.

What we claim is:

1. A micrometer comprising a body formed with a main passage and having a fixed jaw at one side of the passage, a passage arranged transversely of the former passage, and opposite said jaw, a slide arranged in the second-mentioned passage, a gage member slidable lengthwise of the slide and projecting beyond the end of the same toward said jaw, micrometer means for moving said member, and means for holding the slide in its adjusted position in the second-mentioned passage, substantially as and for the purpose described.

2. A tool adjusting micrometer comprising a body formed with a passage, and additional passages extending transversely of the former passage and arranged on opposite sides thereof, a slide arranged in one of the latter passages, means for holding the slide in its adjusted position, a gage member adjustable lengthwise of the slide and projecting beyond the end of the same into the first-mentioned passage, and micrometer means associated with the slide for adjusting the gage member, substantially as and for the purpose specified.

3. The combination with a tool post having means for holding a tool extending transversely thereof, of a gage member for setting the tool comprising a body for engaging the tool post, and micrometer means carried by the body and arranged to engage one end of the tool to move the same a predetermined distance transversely of the body, substantially as and for the purpose set forth.

4. The combination with a tool holder, and a tool extending transversely of the holder, a device for adjusting the tool comprising a body having a passage for the tool holder, a second passage for the tool extending in a direction transversely of the first passage, and a third passage extending in a direction transversely of the first passage and arranged on the opposite side of the first passage to that on which the second passage is located, a slide located in the third passage, means for holding the slide in its adjusted position of the third passage, a gage member movable lengthwise of the slide and projecting beyond the end of the same in position to engage the rear end of the tool, and micrometer means for adjusting the gage member lengthwise of the slide, substantially as and for the purpose described.

In testimony whereof, we have hereunto signed our names at Syracuse, in the county of Onondaga, and State of New York, this 10th day of September, 1920.

GEORGE T. FURNESS.
LLOYD R. SENN.